(12) United States Patent
Lampazzi et al.

(10) Patent No.: US 11,554,853 B2
(45) Date of Patent: Jan. 17, 2023

(54) ADVANCED MISSION INTERACTION CONTROL YOKE FOR ADVANCED AUTOPILOTS OR AUTONOMOUS AIRCRAFT

(71) Applicant: LOCKHEED MARTIN CORPORATION, Bethesda, MD (US)

(72) Inventors: Margaret M. Lampazzi, Oxford, CT (US); Robert S. Takacs, Oxford, CT (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 269 days.

(21) Appl. No.: 16/562,764

(22) Filed: Sep. 6, 2019

(65) Prior Publication Data

US 2021/0070427 A1    Mar. 11, 2021

(51) Int. Cl.
| | | |
|---|---|---|
| *B64C 19/02* | (2006.01) | |
| *B64D 45/00* | (2006.01) | |
| *B64C 13/04* | (2006.01) | |
| *B64C 13/18* | (2006.01) | |
| *G05G 1/01* | (2008.04) | |

(52) U.S. Cl.
CPC .......... *B64C 19/02* (2013.01); *B64C 13/0423* (2018.01); *B64C 13/18* (2013.01); *B64D 45/00* (2013.01); *G05G 1/01* (2013.01); *B64D 2045/0085* (2013.01)

(58) Field of Classification Search
CPC . B64C 19/02; B64C 13/0423; B64C 13/0421; B64C 13/18; B64D 2045/0075
See application file for complete search history.

(56) References Cited

U.S. PATENT DOCUMENTS

| | | | | |
|---|---|---|---|---|
| 5,222,690 A | * | 6/1993 | Jeffords | B64D 43/00 224/276 |
| 5,626,320 A | * | 5/1997 | Burrell | B64D 43/00 248/231.71 |
| 7,017,704 B2 | * | 3/2006 | Kapaan | B62D 1/04 180/315 |
| 8,083,186 B2 | | 12/2011 | Suddreth et al. | |
| 9,132,913 B1 | * | 9/2015 | Shapiro | G08G 5/0086 |
| 9,530,318 B1 | * | 12/2016 | Turner | G08G 5/0034 |
| 9,789,952 B2 | | 10/2017 | Fong et al. | |
| 10,040,574 B1 | * | 8/2018 | Laske, Jr. | B64D 45/0059 |
| 10,809,743 B1 | * | 10/2020 | McCusker | B64C 13/18 |

(Continued)

FOREIGN PATENT DOCUMENTS

KR    20180094553 A    *    8/2018    ......... B64C 13/0423

OTHER PUBLICATIONS

Giorgio Piola, Giorgio Piola's history of F1 steering wheel evolution, Sep. 9, 2020, motorsport.com, https://us.motorsport.com/f1/news/f1-steering-wheel-history-story/4870987/ (Year: 2020).*

*Primary Examiner* — Tien Q Dinh
*Assistant Examiner* — William L Gmoser
(74) *Attorney, Agent, or Firm* — Foley & Lardner LLP

(57) ABSTRACT

An aircraft and a control yoke for operating the aircraft. The control yoke includes a base, a handle for manual operation of the aircraft, and a graphical communication device centered at the base for receiving a command from an operator and autonomously operating the aircraft according to the received command.

18 Claims, 4 Drawing Sheets

(56) References Cited

U.S. PATENT DOCUMENTS

| | | | |
|---|---|---|---|
| 2010/0301080 A1* | 12/2010 | Heckman | B64D 43/00 |
| | | | 224/401 |
| 2012/0261520 A1* | 10/2012 | Groomes | F16M 11/10 |
| | | | 244/234 |
| 2013/0209256 A1* | 8/2013 | Yates | F01D 7/00 |
| | | | 416/112 |
| 2017/0336789 A1* | 11/2017 | Sane | B64C 13/0421 |
| 2019/0211963 A1* | 7/2019 | Longo | G06F 1/1626 |
| 2022/0063836 A1* | 3/2022 | Walter | B64C 13/22 |

* cited by examiner

US 11,554,853 B2

ADVANCED MISSION INTERACTION CONTROL YOKE FOR ADVANCED AUTOPILOTS OR AUTONOMOUS AIRCRAFT

BACKGROUND

The embodiments disclosed herein relate to a method and apparatus for controlling operation of an aircraft with an advanced autopilot or autonomous features, and in particular to an interactive control device for communicating commands to and from the aircraft with an advanced autopilot or autonomous features.

Pilots use a control yoke in order to control operation of the airplane by for example, controlling altitude, attitude, pitch, roll, etc. The control yoke is well-designed for manual control of the aircraft as it allows the pilot to securely grip the device and pull or rotate as needed to input flight commands into the aircraft. However, a control yoke is insufficient for allowing the pilot to interact with an autonomous system. In current systems, the control yoke serves as an input device only and the pilot cannot enter certain commands used and needed in autonomous control of the aircraft.

BRIEF DESCRIPTION

According to an embodiment, a control yoke for operating an aircraft is disclosed. The control yoke includes a base, a handle for manual operation of the aircraft, and a graphical communication device centered at the base for receiving a command from an operator and autonomously operating the aircraft according to the received command.

In addition to one or more of the features described above, or as an alternative, the control yoke further includes a manual instruction input device on the base for changing a parameter at the graphical communication device.

In addition to one or more of the features described above, or as an alternative, the instruction input device includes a knob rotatable to change a parameter to a selected value, wherein pushing the knob inputs the selected value at the graphical communication device.

In addition to one or more of the features described above, or as an alternative, the instruction input device includes a toggle device.

In addition to one or more of the features described above, or as an alternative, the control yoke further includes a biometric sensor for determining a biometric state of the operator.

In addition to one or more of the features described above, or as an alternative. the graphical communication device prompts the operator to enter the command.

In addition to one or more of the features described above, or as an alternative, the control further includes a visual feedback device for indicating a state of the aircraft.

In addition to one or more of the features described above, or as an alternative, the control further includes a bumper to support to the operator when the operator is interacting with the graphical communication device.

According to another embodiment, an aircraft is disclosed. The aircraft includes a control yoke including a base, a handle for manual operation of the aircraft, and a graphical communication device centered at the base for receiving a command from an operator and autonomously operating the aircraft according to the received command.

In addition to one or more of the features described above, or as an alternative, the control yoke further includes a manual instruction input device on the base for changing a parameter at the graphical communication device.

In addition to one or more of the features described above, or as an alternative, the instruction input device includes a knob rotatable to change a parameter to a selected value, wherein pushing the knob inputs the selected value at the graphical communication device.

In addition to one or more of the features described above, or as an alternative, the instruction input device includes a toggle device.

In addition to one or more of the features described above, or as an alternative, the control yoke further includes a biometric sensor for determining a biometric state of the operator.

In addition to one or more of the features described above, or as an alternative, the control yoke further includes a visual feedback device on the control yoke for indicating a state of the aircraft.

In addition to one or more of the features described above, or as an alternative, the control yoke further includes a bumper to support to the operator when the operator is interacting with the graphical communication device.

In addition to one or more of the features described above, or as an alternative, in further embodiments

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
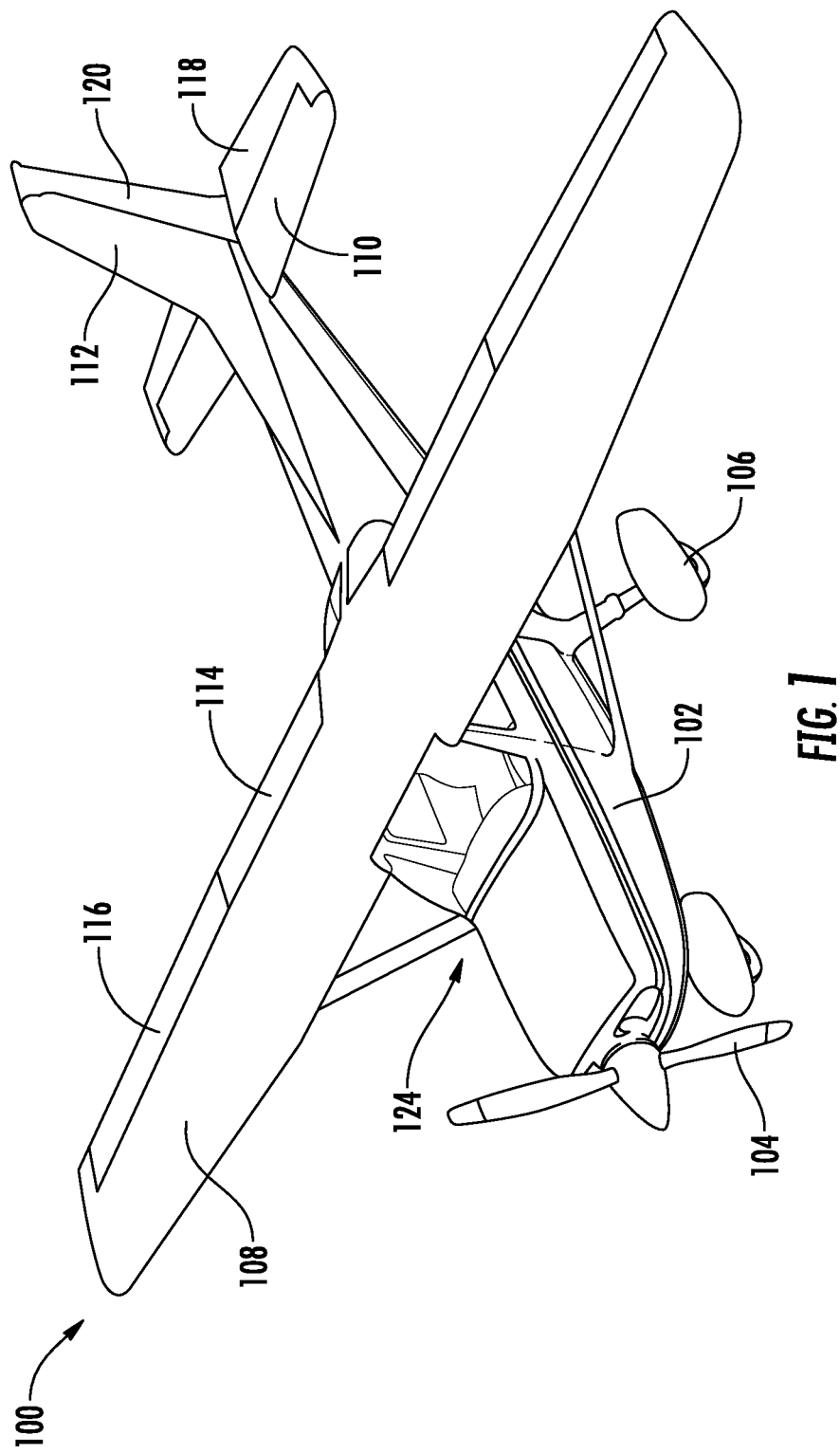
FIG. 1 schematically illustrates an example of an aircraft that can be flown using the control yoke disclosed herein.

FIG. 1 schematically illustrates an example of an aircraft 100 that can be flown using the flight control device disclosed herein. The aircraft 100 is a fixed wing aircraft that includes a fuselage 102, propeller 104 and landing gear 106. The aircraft 100 further includes wing 108 near a front of the aircraft 100 and horizontal stabilizer 110 and vertical stabilizer 112 at a rear of the aircraft 100. The wing 108 includes flaps 114 and ailerons 116 that can be moved up and down with respect to the wing 108 in order to control flight of the aircraft 100. The horizontal stabilizer 110 includes elevators 118 that can be moved up and down to control a pitch of the aircraft 100. The vertical stabilizer 112 includes a rudder 120 that controls a yaw of the aircraft 100. The aircraft 100 includes a cockpit 124 that includes room or seats for a pilot. In various embodiments, the cockpit 124 can also include room for a co-pilot. In various embodiments, cockpit 124 also includes seats for passengers. Various flight controls in the cockpit 124 are operated to move the parts of the aircraft 100 such as the flaps 114, ailerons 116, elevators 118 and rudder 120, for example, to control the aircraft 100. The aircraft 100 may also include a set of sensors that obtain flight data with regard to the aircraft 100, such as altitude, flight speed, etc. This flight data can be displayed to a pilot of the aircraft 100 at an instrument panel in order to aid the pilot in flying the aircraft 100. In alternate embodiments, the aircraft 100 can be a jet aircraft.

Figure 2:
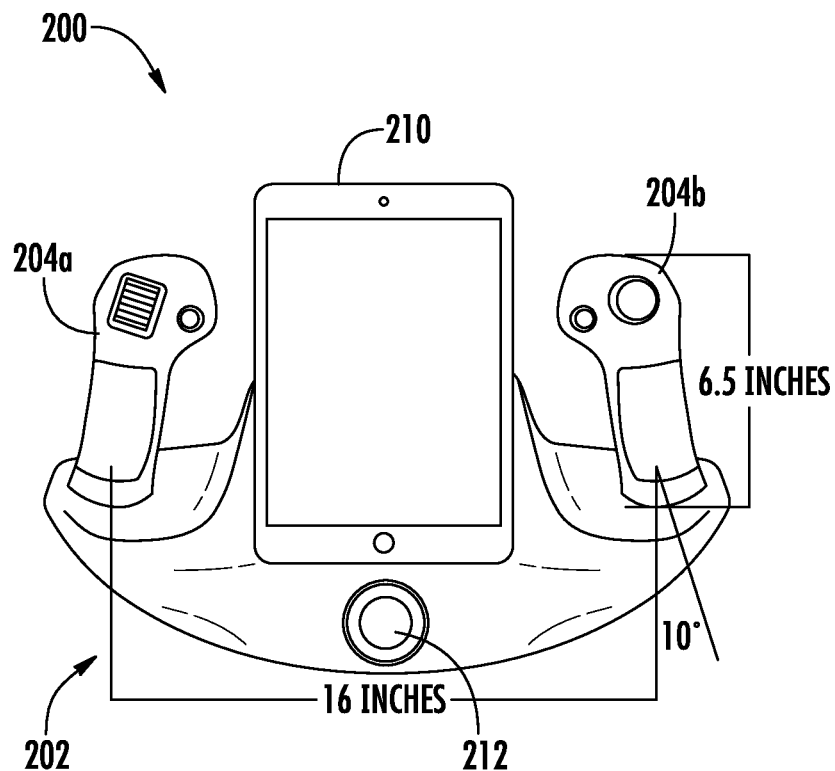
FIG. 2 shows an illustrative aircraft control yoke suitable for use in communicating a command to the aircraft for autonomous control of the aircraft.

FIG. 2 shows an illustrative aircraft control device or control yoke 200 suitable for use in communicating a command to the aircraft for autonomous control of the aircraft as well as allowing the pilot to communicate a command to the aircraft while retaining the ability to manually control the aircraft during a manual control flight mode. The control yoke 200 includes a base 202 supporting at least one grip or handle 204a, 204b by which an operator can control movement of the control yoke 200. The handles 204a, 240b can be referred to as horns off the yoke. The base 202 is attached to a support structure or shaft and the mechanism that translates the pilot's force into a movement of the control surfaces, such as ailerons and elevators, roll spoilers, etc. The handles 204a, 204b can be set at an angle (e.g., 10 degrees) in order to be ergonomically suited to the operator. At least one of the handles 204a, 204b can include a button for engaging and disengaging autonomous control of the aircraft.

The control yoke 200 further includes a graphical communication device 210 centrally located at the control yoke 200 for enabling communication of parameters for autonomous operation of the aircraft between the operator and the aircraft. In various embodiments, the graphical communication device 210 is located between the left handle 204a and the right handle 204b, allowing ease of access for the pilot whose hands are on the handles 204a, 204b. The graphical communication device 210 either can be a permanent or integrated component on the base 202 or can be attachable and removable from the base 202 depending on flight operations and/or operator desires. In various embodiments, the graphical communication device 210 can be a mobile device such as a computer tablet or similar device. The location of the graphical communication device 210 when seated on the control yoke 200 places it directly in front of the operator during operation of the aircraft. The location of the graphical communication device 210 on the base 202 allows for a single operator to both manually operate the aircraft 100 when in a manual mode of operation and to enter commands to the aircraft during an autonomous mode of operation. Furthermore, the operator can interact with the aircraft without having to disengage from the autonomous system.

The graphical communication device 210 can be used by the operator to select various autonomous control commands and their values. An instruction input device 212 of the control yoke 200 allows the operator to enter a selection or command into the aircraft. The instruction input device 212 can be located at the base of the control yoke 200. However, the location and size of the instruction input device 212 can be selected for ease of use. The instruction input device 212 can be in various forms, such as a knob, a button, a toggle, a switch, etc., in various embodiments. In an embodiment in which the instruction input device 212 is a knob, the knob can be pushed to enter a command and can be rotated in order to select a parameter or to move a cursor within the graphical communication device.

Referring to FIG. 2, in various operations, the graphical communication device 210 can visually present a request for a command to the operator and allow the operator to enter a command. For example, the graphical communication device 210 can request an altitude command from the operator. In response, the operator can drag a finger across a screen of the graphical communication device 210 in order to select a value for the altitude. Alternatively, the operation can turn the knob to select the altitude value. Upon selecting the altitude value, the operator can then enter the value by pushing or pressing the instruction input device 212.

Figure 3:
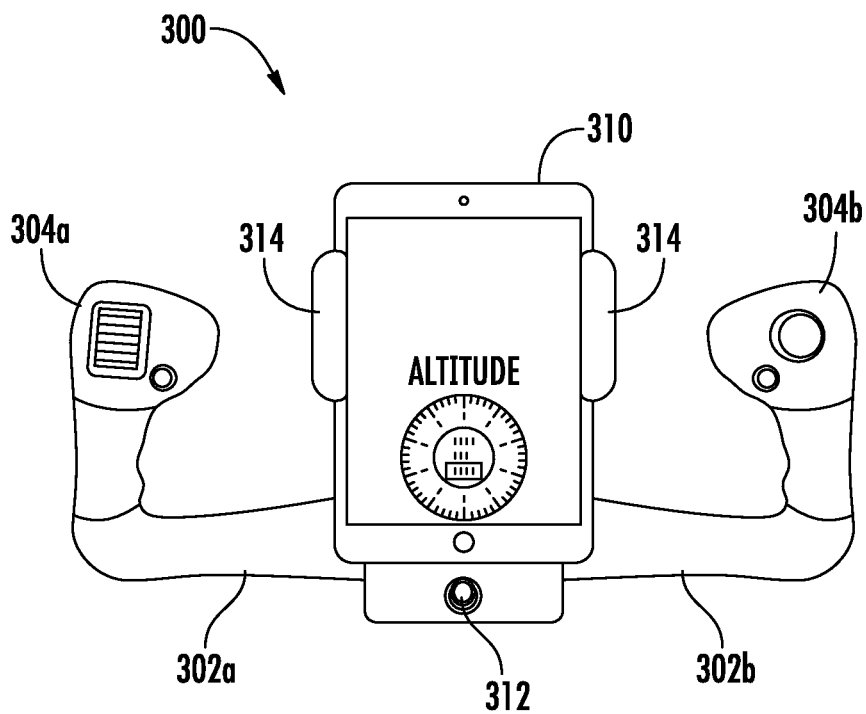
FIG. 3 shows a control yoke in an alternate embodiment.

FIG. 3 shows a control yoke 300 in an alternate embodiment. The control yoke 300 includes handles 304a, 304b and graphical communication device 310 as well as knob 312. The control yoke 300 further includes bumpers 314 allowing support to the operator when the operator is interacting with the graphical communication device 310. The bumpers 314 can be hand grips or finger grips. The handles 304a and 304b are at the end of horizontally extending arms 302a and 302b, respectively. The operator can rest his or her hands on the arms 302a and 302b when not directly communicating commands into the aircraft. The arms 302a and 302b may also include biometric sensors that allow the aircraft to monitor the operator and sense or detect a level of engagement or awareness of the operator. Such biometric sensors can include a pulse sensor, an oximeter for monitoring a person's oxygen saturation, a retina camera for reading levels of operator alertness, etc. The biometric sensors need not be located on the arms 302a, 302b and, in various embodiments, biometric sensors can be placed at ergonomically suitable locations of the control yoke 300 (or base 202 in FIG. 2). The biometric sensors may be located in the grips to monitor the pilot even as they fly the aircraft manually. In alternate embodiments, the biometric sensors can be placed on the arms 302a and 302b. Placement of the biometric sensors at the arms 302a, 302b can mandate that the pilot perform an intentional action in order to interact with the biometric sensor. An optical retina sensor can be located in the center of the control yoke 300 at a location near an eye of the pilot. If the pilot is not sensed to be actively flying the aircraft, the biometric sensor may conclude that the pilot is incapacitated or not actively engaged in flying and may autonomously fly the aircraft or at least keep the aircraft within a prescribed safe flight envelope. Additionally, the graphical communication device 310 can perform a biometric test by periodically presenting a quiz for the operator to answer to affirm that the operator is still at the control yoke or operationally aware. When the operator fails certain biometric tests, the aircraft can take appropriate action, such as to take autonomous control of the aircraft, alert, awaken or prompt the operator, send an emergency signal, etc.

Figure 4:
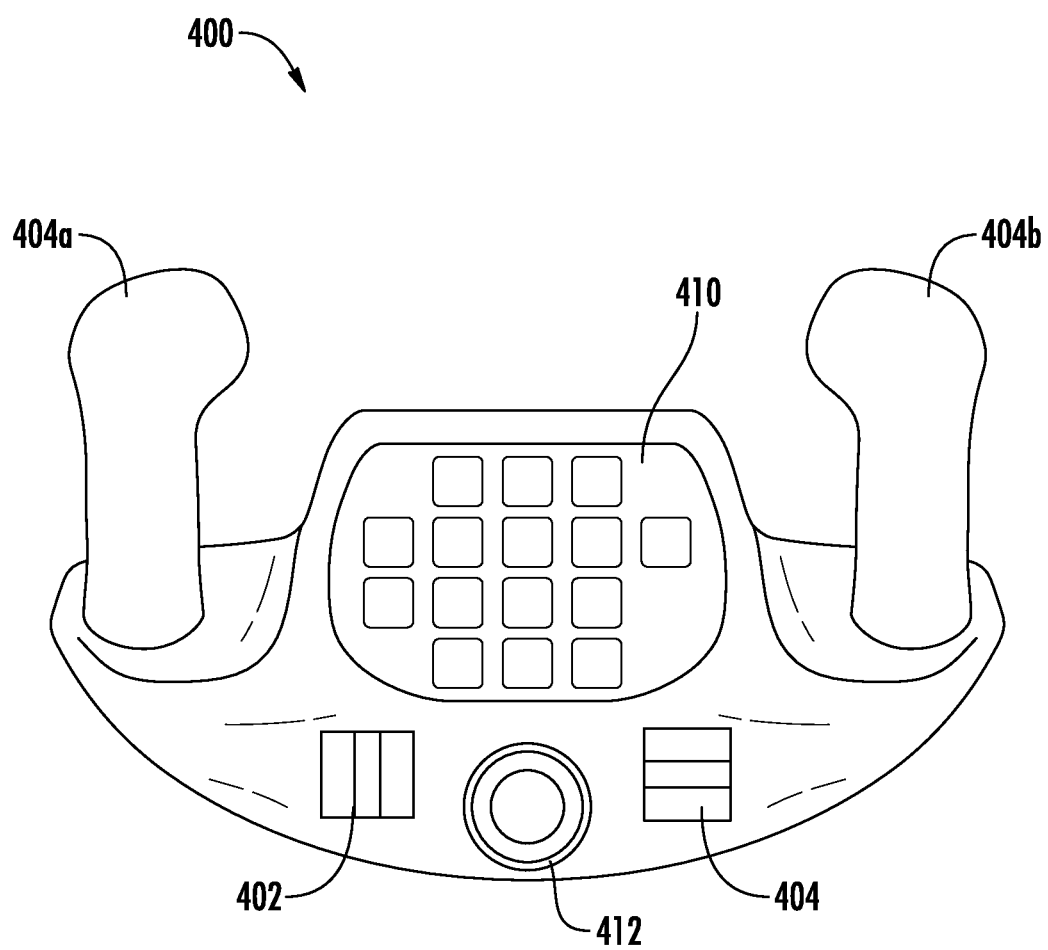
FIG. 4 shows a control yoke in another embodiment.

FIG. 4 shows a control yoke 400 in another embodiment. The control yoke 400 includes handles 404a and 404b and an integrated graphical communication device 410. In addition to knob 412, the control yoke 400 includes additional instruction input devices, such as toggle 402 and toggle 404. Once a parameter is selected at the screen of the graphical communication device 410, the parameter can be entered by pushing the knob 412. Toggles 402 and 404 can be used for various purposes, including entering data and/or commands, selecting parameters, moving a cursor at the graphical communication device 410, etc. For example, one of the toggles (e.g., left toggle 402) can be used to navigate through parameter on the screen, while the other of the toggles (e.g., right toggle 404) can be used to select a value for a selected parameter. Toggles can be oriented in a suitable direction. For example, left toggle 402 is oriented in a left-right direction and right toggle 404 is oriented in an up-down direction.

Figure 5:
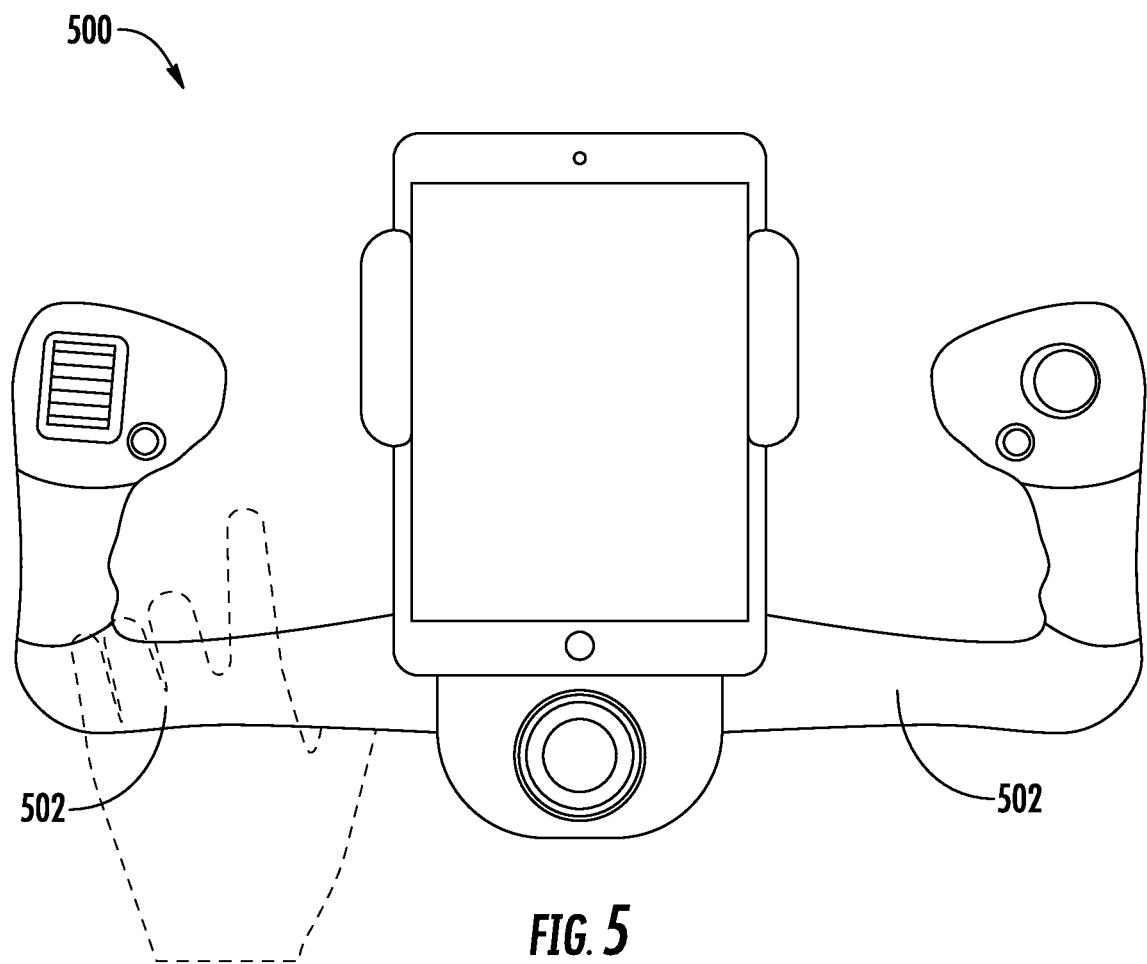
FIG. 5 shows a control yoke having a visual feedback device for the communication with the operator.

FIG. 5 shows a control yoke 500 having a visual feedback device 502 for the communication with the operator. In one embodiment, the visual feedback device 420 includes an LED strip that displays different colors to indicate different states or modes of the aircraft. For example, the LED displays a first color (e.g., magenta) to indicate that the aircraft is being operated autonomously, a second color (e.g., white) to indicate that the autonomous aircraft control is disengaged, and a third color (e.g., green) to indicate that the aircraft control is being controlled by a human operator. Additionally, the LED light can flash at one or more rates in order to communicate different aircraft/system intentions to the operator. For example, when the system intends to bank right, the LED light strip on the right arm can extend out in equivalent degrees (i.e., level of bank) as the intended maneuver. In other words, the centermost LED can illuminate at a smallest bank angle and LED lights further out from the center can populate or turn on sequentially as the bank angle increases. When a desired bank angle is reached, the LED strip can change, for example, from flashing to a solid color.

In another embodiment, the visual feedback device 52 can be used to indicate who is in control of the aircraft and when the aircraft is in transition between autonomous and operator input control. For example, the LED can display a solid magenta color when being control autonomously. However, the LED color flashing over a selected time duration (coupled with an auditory annunciation) can indicate to the user the system is intending to transfer control to the human operator. Once human operator has hands on the control yoke for a selected time duration, the aircraft system can confirm that the human operator is in control by having the LED visual device change from a flashing color (e.g., magenta) to solid steady state LED color (e.g., green).

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A control yoke for operating an aircraft, comprising:
a base located on the control yoke to support a handle;
the handle for manual operation of the aircraft by an operator;
a graphical communication device removably attached to the base of the control yoke, the graphical communication device configured to:
    communicate with the aircraft while the graphical communication device is removed from the base of the control yoke; and
    transmit a command received from the operator to the aircraft to autonomously operate the aircraft according to the command;
an input device located at the base of the control yoke, the input device separate from the graphical communication device and configured to:
    receive an input from the operator; and
    provide, responsive to receipt, the input to the graphical communication device to interact with the graphical communication device; and
a biometric sensor located on the control yoke, the biometric sensor, in communication with the graphical communication device, configured to:
    determine a biometric state of the operator; and
    present, on the graphical communication device, a biometric test comprising a quiz for the operator to answer to affirm that the operator at the control yoke is operationally aware.

2. The control yoke of claim 1, wherein the input device includes a knob rotatable to change a parameter to a selected value, wherein pushing the knob inputs the selected value at the graphical communication device.

3. The control yoke of claim 1, wherein the input device includes a toggle device.

4. The control yoke of claim 1, wherein the graphical communication device prompts the operator to enter the command.

5. The control yoke of claim 1, further comprising a visual feedback device on the control yoke for indicating a state of the aircraft.

6. The control yoke of claim 5, further comprising a bumper to support to the operator when the operator is interacting with the graphical communication device.

7. An aircraft, comprising:
a control yoke comprising:
    a base located on the control yoke to support a handle;
    the handle for manual operation of the aircraft by an operator;
    a graphical communication device removably attached to the base of the control yoke, the graphical communication device configured to:
        communicate with the aircraft while the graphical communication device is removed from the base of the control yoke; and
        transmit a command received from the operator to the aircraft to autonomously operate the aircraft according to the command;
    an input device located at the base of the control yoke, the input device separate from the graphical communication device and configured to:
        receive an input from the operator; and
        provide, responsive to receipt, the input to the graphical communication device to interact with the graphical communication device; and
    a biometric sensor located on the control yoke, the biometric sensor, in communication with the graphical communication device, configured to:
        determine a biometric state of the operator; and
        present, on the graphical communication device, a biometric test comprising a quiz for the operator to answer to affirm that the operator at the control yoke is operationally aware.

8. The aircraft of claim 7, wherein the input device includes a knob rotatable to change a parameter to a selected value, wherein pushing the knob inputs the selected value at the graphical communication device.

9. The aircraft of claim 7, wherein the input device includes a toggle device.

10. The aircraft of claim 7, further comprising a visual feedback device on the control yoke for indicating a state of the aircraft.

11. The aircraft of claim 7, further comprising a bumper to support to the operator when the operator is interacting with the graphical communication device.

12. The control yoke of claim 1, wherein the handle comprises a button to engage or disengage autonomous control of the aircraft.

13. The control yoke of claim 12, wherein the input device transmits a second command based on the input to the graphical communication device to enter a parameter on the graphical communication device that controls an autonomous operation of the aircraft.

14. The control yoke of claim 13, wherein the base is attached to a support structure configured to translate force from the operator into a movement of a control surface of the aircraft for manual operation.

15. The control yoke of claim 1 comprising:
the biometric sensor configured to:
conclude, based on the biometric state, that the pilot is not actively engaged in flying the aircraft; and
engage or maintain autonomous operation of the aircraft responsive to the conclusion that the pilot is not actively engaged in flying the aircraft, wherein the biometric sensor comprises at least one of a pulse sensor or an oximeter.

16. The control yoke of claim 12, comprising:
the biometric sensor configured to:
conclude, based on the biometric state, that the pilot is not actively engaged in flying the aircraft.

17. The control yoke of claim 1, wherein the biometric sensor comprises a retina sensor to monitor an eye of the operator.

18. The control yoke of claim 1, comprising:
the graphical communication device configured to receive touch input from the operator to select a value for an altitude; and
the input device, separate from the graphical communication device, to receive input from the operator to set the value for the altitude responsive to the selection made via the graphical communication device.

* * * * *